United States Patent [19]

Pacht

[11] Patent Number: 5,244,182
[45] Date of Patent: Sep. 14, 1993

[54] FLUID FLOW CONTROL VALVE

[75] Inventor: Amos Pacht, Houston, Tex.

[73] Assignee: Butterworth Jetting Systems, Inc., Houston, Tex.

[21] Appl. No.: 932,634

[22] Filed: Aug. 20, 1992

[51] Int. Cl.$^5$ .............................. F16K 1/04; F16K 1/52
[52] U.S. Cl. ..................................... 251/205; 251/297; 74/527
[58] Field of Search ................... 251/297, 205; 74/527

[56] References Cited

U.S. PATENT DOCUMENTS

| | | | |
|---|---|---|---|
| 963,215 | 7/1910 | Eggleston | 251/297 X |
| 1,762,178 | 6/1930 | Lear | 251/297 X |
| 1,861,916 | 6/1932 | Hennebohle . | |
| 2,610,024 | 9/1952 | Wirth et al. | 251/297 |
| 2,784,934 | 3/1957 | Paulius, Jr. et al. | 251/297 X |

Primary Examiner—Arnold Rosenthal
Attorney, Agent, or Firm—Jones, Day, Reavis & Pogue

[57] ABSTRACT

A high pressure fluid flow control valve that can accurately regulate the volume of fluid flow through the valve in discrete steps by means of a ratchet mechanism associated with a rotatable shaft. The rotatable shaft has a sealing surface on one end for mating with a sealing surface on the output port to close the output port or open it as the shaft is rotated. The shaft is threadedly engaged with the body portion such that it can be rotated a limited portion during opening the valve so that it cannot be accidentally rotated out of the body portion and the valve disassembled. A bleed valve is associated with the hollow chamber to limit the maximum pressure in the valve chamber.

9 Claims, 1 Drawing Sheet

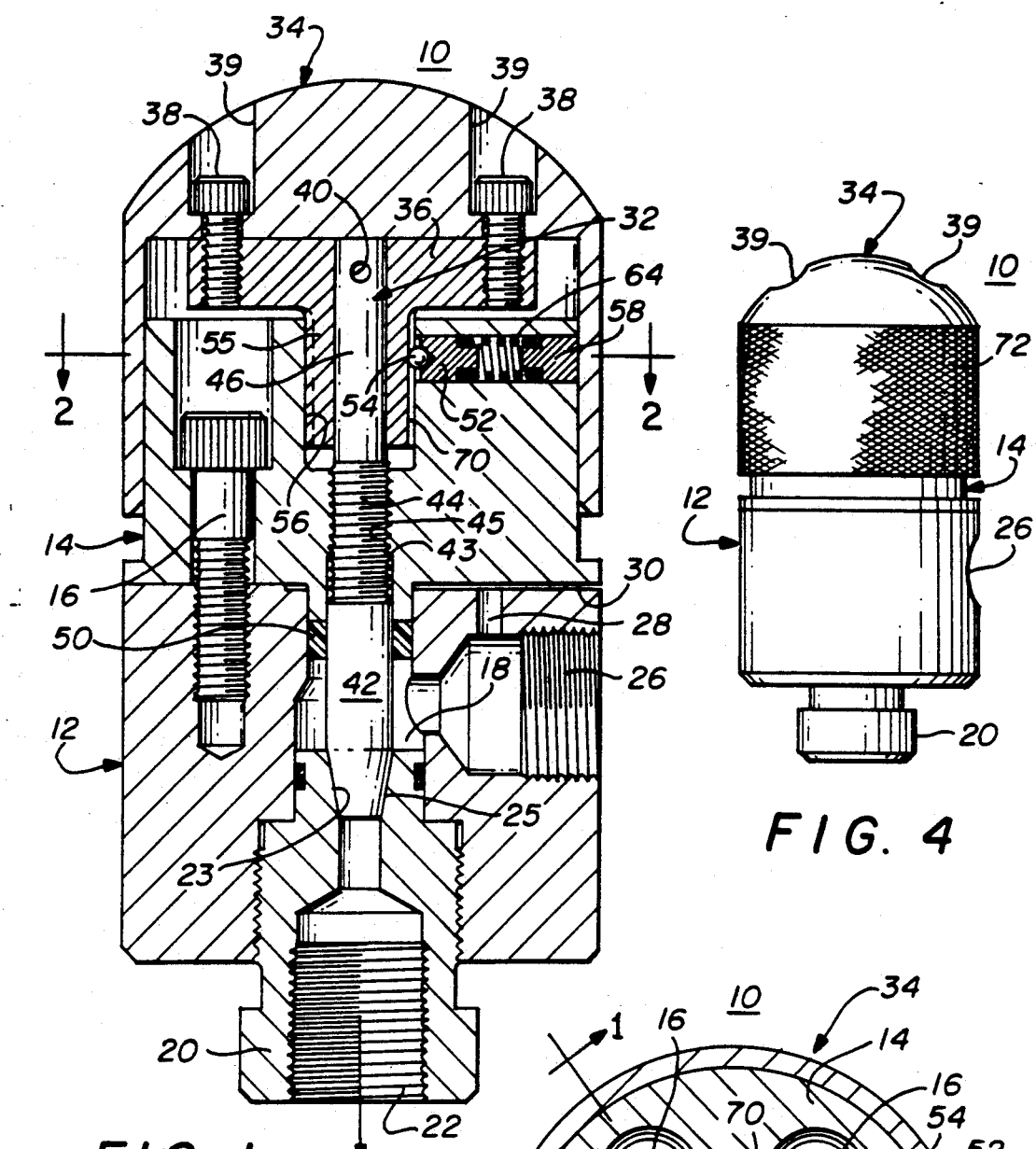
FIG. 1
FIG. 3
FIG. 4
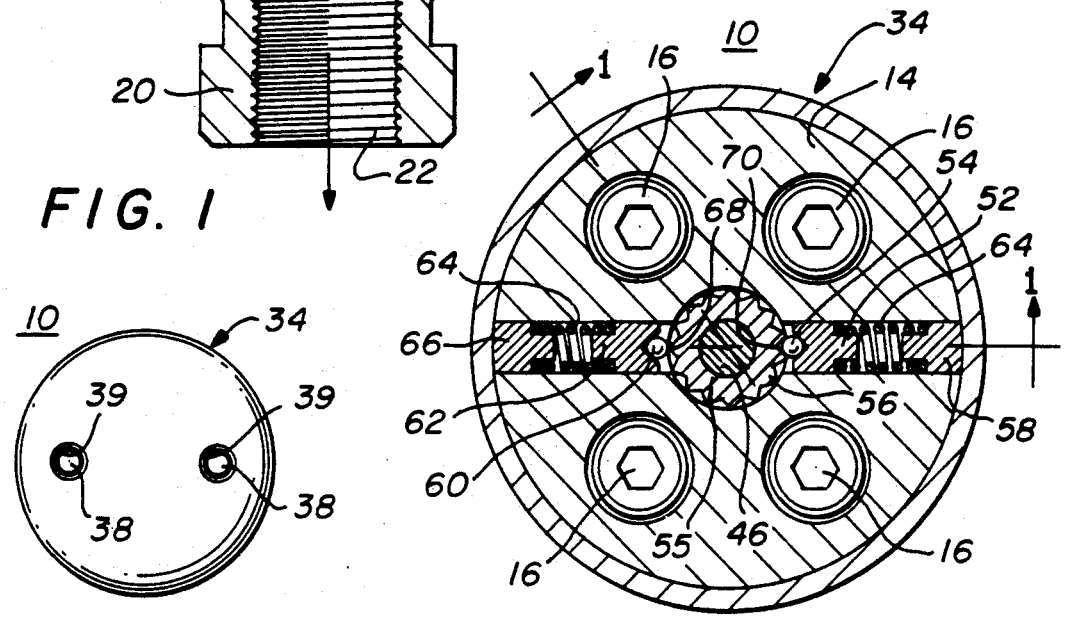
FIG. 2

FLUID FLOW CONTROL VALVE

FIELD OF THE INVENTION

The present invention relates generally to the control of high pressure fluid and in particular to a high pressure fluid flow control valve that can accept a high pressure fluid input at a first flow rate and allow the fluid to exit at a second flow rate.

BACKGROUND OF THE INVENTION

High pressure guns are conventionally utilized at the discharge end of a high pressure water delivery line to selectively control the operative discharge of the high pressure water or other fluid to a nozzle portion of the gun via an internal valve mechanism disposed within the gun body and actuated by a trigger lever member pivotally secured to the gun body. The source of the high pressure fluid may produce the fluid at a particular flow rate such as, for example only, 11 gallons per minute. The high pressure gun may utilize a maximum of 10 gallons per minute. In such case, the fluid flow rate from the high pressure source must be adjusted to the flow rate that can be accepted by the gun.

Such flow control valves must be able to handle pressures of from 6,000 to 20,000 psi, be easy and economic to manufacture, simple to use in adjusting the flow rate and include safety features that prevent the valve from being accidentally disassembled while the high pressure fluid is present in the valve.

The present invention discloses a high pressure fluid flow control valve that is substantially cylindrical in shape, is less than 3 inches in diameter and is approximately 5 inches in height. It has a body portion with a fluid input port and a fluid output port. A valve seat is formed in the fluid output port for receiving a fluid seal. One end of a rotatable shaft or valve stem forms a seal with the valve seat in the fluid outlet port. The shaft is rotatably mounted in the body portion in threaded relationship such that rotation of the shaft moves it toward and away from the valve seat in the output orifice to control the degree of fluid flow between a fully closed and a fully opened valve position. The shaft has a first diameter with the threads on only a portion thereof and a smaller diameter above the threads such that the shaft can be rotated toward the output orifice to close the valve and to be threaded out of the body to disassemble the valve but can be moved toward the fully opened position only a limited distance to prevent disassembly of the valve accidentally with high pressure fluid applied thereto. The valve is rotatable to a plurality of fixed positions for controlling the degree of fluid flow between the input and output ports. Elongated spaced teeth surround at least a portion of the shaft and a spring-loaded ball, or elongated pin, is positioned on each side of the shaft for engaging the spaced teeth such that when one ball or pin is in the space between teeth, the other ball or pin is resting on a tooth thus allowing fixed positions of the shaft as the shaft is rotated. The number of fixed positions of the shaft is twice the number of spaced teeth on the shaft. Further, a radial groove extends partially into the body portion adjacent the input port. A pressure bleed port is formed on the interior of the input port and is coupled to the radial groove such that pressure in the valve chamber is prevented from exceeding a predetermined value. A fluid seal surrounds the rotatable valve stem or shaft above the input valve and below the shaft threads for forming a hollow chamber coupling the input port to the output port. A coupler, T-shaped in cross section, is attached to the valve stem such that rotation of the coupler rotates the threaded valve stem to control the degree of fluid flow through the valve between zero gallons per minute and a maximum number of gallons per minute. A substantially hollow U-shaped cap surrounds the body portion and is attached to the coupler such that rotation of the cap rotates the coupler and the threaded valve stem to control the degree of fluid flow through the valve. The U-shaped cap surrounds substantially the entire upper portion of the body thus protecting the upper body portion from shocks that might be generated external to the upper body portion. Thus, the upper body portion is less sensitive to damage from external forces. The U-shaped cap will only transmit rotation motion, or torque, to the valve stem.

Thus it is an object of the present invention to provide a high pressure control valve that can be placed between a high pressure fluid pump and a high pressure discharge source such as a fluid gun that can easily be adjusted to regulate the fluid flow to the gun in number of gallons per minute.

It is also an object of the present invention to provide a high pressure fluid flow control valve that has a ratchet device associated with a valve stem and a body portion for providing a plurality of fixed rotatable positions of the valve stem such that an adjustable fluid flow can be provided from a fluid inlet port to a fluid outlet port.

It is yet another object of the present invention to provide a high pressure fluid flow control valve that has an elongated shaft for providing an adjustable fluid flow and that can be rotated toward the output orifice to seal the output orifice or to dissemble the valve but can be moved toward the open position only a limited distance to prevent disassembly of the valve accidentally with high pressure applied thereto.

SUMMARY OF THE INVENTION

Thus the invention relates to a high pressure fluid flow control valve comprising a body portion having a fluid input port and a fluid output port, an elongated hollow chamber in the body portion in fluid transfer relationship with the input/output ports, a rotatable valve stem sealably mounted in the body member and extending in the hollow chamber for engagement with the output port and controlling the degree of fluid flow between the input and output ports from a closed position to a fully open position, and a ratchet device associated with the valve stem and the body portion for providing a plurality of fixed rotatable positions of the valve stem such that a predetermined fluid flow from the inlet port to the outlet port can be adjusted.

BRIEF DESCRIPTION OF THE DRAWINGS

These and other objects of the present invention will be more fully disclosed when taken in conjunction with the following detailed description of the drawings in which like numerals represent like elements and in which:

FIG. 1 is a cross-sectional view of the novel valve taken essentially along the lines 1—1 of FIG. 2;

FIG. 2 is a cross-sectional view of the novel valve taken along the lines 2—2 of FIG. 1;

FIG. 3 is a top view of the assembled fluid flow control valve; and

FIG. 4 is a side view of the novel high pressure fluid flow control valve.

DETAILED DESCRIPTION OF THE DRAWINGS

FIG. 1 is a cross-sectional view of the novel high pressure fluid flow control valve shown in side view in FIG. 4 in its assembled condition and taken essentially along lines 1—1 of FIG. 2 except that it includes the entire valve. As can be seen in FIG. 1, the novel valve 10 is formed of first and second body portions 12 and 14 which are held together by a plurality of bolts 16. A single body portion could be formed, but the preferred embodiment includes both first and second body portions 12 and 14. All of the bolts 16 can be seen in the cross-sectional view shown in FIG. 2. An elongated hollow chamber 18 extends between and through the first and second body portions 12 and 14. An outlet port 22 is formed in insert 20 that is threaded into the body portion 12. An inlet port 26 is formed in the side of body portion 12 and both the inlet port 26 and outlet port 22 are in fluid transfer relationship with the elongated hollow chamber 18. A radial groove 30 exists between body portions 12 and 14 and extends to atmosphere. A pressure bleed port 28 on the interior of input port 26 couples the input port to the radial groove 30 such that the pressure in the valve chamber 18 is prevented from exceeding a predetermined value determined by the size of the radial groove 30 and bleed port 28. An elongated shaft 32 is inserted in the elongated chamber 18 in a fluid sealing relationship with the body portions 12 and 14 and is in a threaded relationship with the body portion 14 such that rotation of the shaft 32 moves the shaft 32 toward and away from the valve seat 23 in the output orifice insert 20 to control the degree of fluid flow between a fully opened and a fully closed position of the valve. A fluid seal 50 is interposed between the shaft 32 and the body portion 12 to form a fluid-tight chamber 18. A sealing surface 25 in the shape of a truncated cone is formed on the lower end of the shaft 32 for mating contact with a valve seat 23 on the output orifice insert 20 to seal the valve and prevent the fluid flow or to open the valve and allow fluid flow. A coupler 36, T-shaped in cross section, is attached to the cap portion 34 by means of bolts 38 in recesses 39. The coupler 36 is also coupled to the upper end of shaft 32 by attachment device 40 such as a bolt, rivet or cotter pin 40. Thus, when the cap portion 34 is rotated, the T-shaped coupler 36 is also rotated and the threaded shaft 32 is rotated to control the degree of fluid flow through the valve 10. Shaft 32 has a first diameter 42 with threads 44 on a portion thereof. Shaft 32 has a second smaller diameter 46 above the threads 44 such that the shaft 32 can be rotated toward the output orifice 22 to close the valve but can be moved toward the cap 34 only a limited distance to prevent disassembly of the valve 10 accidentally with high pressure fluid applied thereto. It will be seen that the orifice in body portion 14 that, extends into the hollow chamber 18 has a threaded small diameter 45 that engages the threaded portion 44 of shaft 32 and a larger diameter that begins at 43 that accommodates but does not engage the threads 44. Thus, as valve stem 32 is rotated such that the shaft moves upwardly in FIG. 1, it can only move to a point where the unthreaded portion on diameter 42 engages the threads 45 on body 14. The shaft cannot move any further upwardly. This prevents the valve from being accidentally disassembled by continued rotation of cap 34 until the threads 44 completely disengage from body portion 14. If such were to happen with the 6,000 to 20,000 psi fluid pressure in chamber 18, there would, of course, be a dangerous explosion of the valve components. By using a first diameter 42 on the shaft 32 and a second smaller diameter 46, the shaft 32 can be threaded downwardly through the body portion 14 to remove it from the valve 10, but it cannot be removed by threading it upwardly.

In order to provide a number of fixed positions of shaft 32 to accurately control the degree of fluid flow through the valve, elongated spaced teeth 56 surround at least a portion of the vertical projection 55 on the coupler 36. Spring-loaded projections 54 and 60 such as elongated pins or balls, see FIG. 2, are located in the first or upper body portion 14 on each side of the vertical projection 55 of the vertical portion 55 of coupler 36 for engaging the elongated spaced teeth 56. As can be seen in FIG. 2, a projection holder 52 is forced against a projection 54 by a spring 52. An outer portion 58 may be inserted in the body member 14 in any well-known manner, such as by threads, to adjust the tension against the projection 54. Another spring-loaded projection 60 is on the other side of the vertical projection 55 of the coupler 36 diametrically opposite projection 54. It also has a projection holder 62 that is forced by a spring 64 against the teeth of the vertical portion or projection 55 of the coupler 36. Again, a threaded portion 66 may be used to adjust the tension on spring 64. As the cap 34 is rotated, coupler 36 also rotates causing the elongated spaced teeth 56 to rotate. The projection 52, when engaging the vertical projection 55 between teeth 56, forms a ratchet device for allowing the valve to be incrementally opened or closed. It will be noted in FIG. 2 that when projection 54 is between two spaced teeth 56, projection 60 rests on the tip of one of the teeth designated particularly by the numeral 68 in FIG. 2. Thus, when one projection is in the space between the elongated teeth 56, the other projection is resting on a tooth, thus allowing fixed positions of the shaft as the cap 34 is rotated, the number of fixed positions of the shaft 32 being twice the number of spaced teeth 56 on the vertical portion 55 of the coupler 36. In FIG. 1 and FIG. 4, it can be seen that cap 34 surrounds substantially the entire upper body portion 14. This construction protects the upper body 14 and its associated elements from damage that could occur from outside forces. The unit is therefore less sensitive to damage due to external forces. Cap 34 will transmit only rotational motion or torque to the valve stem 46. The internal elements are therefore protected from shocks applied external to the unit.

FIG. 3 is a top view of the novel valve 10 illustrating the cap 38 with orifices 39 and bolts 38 therein to hold the cap to the coupler 36.

FIG. 4 is a side view of the novel valve 10 illustrating the lower body portion 12, the upper body portion 14, and the cap 34. Cap 34 has a knurled surface 72 to assist in grasping the cap 34 to rotate the cap. Input orifice 26 can be seen and output orifice body member 20 can also be seen. The valve in FIG. 3 is less than 2 inches in diameter and the height of the valve as shown in FIG. 4, exclusive of the output port body portion 20, is less than 5 inches in height. Thus the valve is relatively small, simply constructed and is able to adjust fluid flow rate of high pressure fluid having pressures from 6,000 to 20,000 psi.

The valve may be disassembled as follows. First, the cap 34 is removed by removing the bolts 38 in the orifices 39. The coupler 36 is then removed from shaft 32 by removing the connector device 40. Body portion 20 for the output port 22 is then threadedly removed from body 12. Shaft 32 can then be rotated such that the shaft 32 moves downwardly through the threaded portion 45 of body portion 14 and until the threads disengage. At that point, the rotatable valve stem 32 can be removed from the valve. Bolts 16 can then be removed and the body portions 12 and 14 separated. Thus there has been a complete disassembly of the valve 10. Again, note however the valve stem 32 cannot be rotated such that it is completely removed from body portion 14 by moving it upwardly in the valve 10. It can only be removed by rotating it such that it moves downwardly until the threads 44 disengage from the threads 45 on the body portion 14. As stated previously, this prevents accidental disengagement of the shaft 32 with the body portion 14 thus disassembling the valve 10 while high pressure is applied to the input port 26 which would, of course, create a very dangerous condition.

Thus, there has been disclosed a novel fluid flow control valve that can easily and accurately regulate and adjust the volume of fluid flow through the valve in graduated steps. The valve has a rotatable shaft therein with a valve seat at one end for opening and closing the output port of the valve. The valve stem cannot be unthreaded from the body thus preventing any accidental disassembly of the valve with high pressure fluid therein. Further, it has a ratchet system for enabling the valve stem to be rotated in positive steps to incrementally open and close the valve. A pressure relief valve is built into the system by means of a radial groove communicating with the input port such that if the pressure in the valve chamber exceeds a predetermined value, it is relieved through the radial groove thus, preventing a dangerous pressure build up in the valve. A hollow cap is U-shaped in cross section and surrounds substantially the entire upper body portion to protect the internal elements from damage due to shock caused by external forces.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A high pressure fluid flow control valve comprising:
   a first body portion;
   a second body portion abutting and connected to the first body portion in fluid sealable relationship;
   a substantially hollow cap portion for surrounding the first body portion;
   a fluid input port and a fluid output port in the second body portion;
   a valve seat in the fluid outlet port for receiving a fluid seal;
   an elongated hollow chamber extending between and through the first and second body portions in fluid transfer relationship with the input/output ports;
   a shaft inserted in the elongated chamber in a fluid sealing relationship with the second body portion and in a threaded relationship with the first body portion such that rotation of the shaft moves the shaft toward and away from the valve seat in the fluid output port to control the degree of fluid flow between a fully opened and a fully closed position of the valve;
   a sealing surface on one end of the shaft for mating with the valve seat to seal the valve and prevent fluid flow and to open the valve and allow fluid flow;
   a coupler with a vertical stem, the coupler being attached to both the cap portion and the other end of the shaft such that rotation of the cap portion rotates the coupler and the threaded shaft to control the degree of fluid flow through the valve;
   elongated spaced teeth surrounding at least a portion of the vertical stem of the coupler;
   a spring-loaded projection in the first body portion on each side of the vertical stem for engaging the elongated spaced teeth such that when one projection is in the space between teeth, the other projection is resting on a tooth thus allowing fixed positions of the shaft as the cap is rotated, the number of fixed positions of the shaft being twice the number of spaced teeth on the vertical stem of the coupler;
   a radial groove between the first and second body portions extending to atmosphere; and
   a pressure bleed port coupling the input port to the radial groove such that the pressure in the valve chamber is prevented from exceeding a predetermined value.

2. A fluid flow control valve as in claim 1 further comprising:
   a first diameter on the shaft with the threads on only a portion thereof; and
   a smaller diameter on the shaft above the threads such that the shaft can be rotated toward the output orifice to disassemble the valve but can be moved towards the cap only a limited distance to prevent disassembly of the valve accidentally with pressure applied thereto.

3. A high pressure fluid flow control valve comprising:
   a body portion having a fluid input port and a fluid output port;
   an elongated hollow chamber in the body portion in fluid transfer relationship with the input/output ports;
   a rotatable valve stem sealably mounted in the body member and extending into the hollow chamber for controlling the degree of fluid flow between the input and output ports from a closed position to a fully open position;
   ratchet means associated with the valve stem and the body portion for providing a plurality of fixed rotatable positions of the valve stem such that predetermined fluid flow from the inlet port to the outlet port can be adjusted;
   a first diameter on the rotatable valve stem having threads on only a portion thereof for threadedly mounting in the hollow chamber of the body portion; and
   a second smaller diameter on the valve stem above the threads such that the shaft can be rotated toward the output orifice to disassemble the valve but can be moved away from the output orifice only a limited distance to open the valve and prevent disassembly of the valve accidentally with high pressure fluid applied thereto.

4. A control valve as in claim 3 wherein the ratchet means comprises:
 elongated spaced teeth surrounding a portion of the valve stem; and
 at least one spring-loaded projection in the body portion for engaging the teeth such that the projection rests between teeth to hold the stem in a fixed position thus allowing a plurality of fixed positions of the valve stem equal to the number of teeth on the stem.

5. A high pressure fluid flow control valve as in claim 4 further including a second spring-loaded projection in the body on the side of the stem opposite the at least one projection such that when the at least one projection is in a space between teeth, the second projection rests on a tooth thus allowing the number of fixed positions of the stem to be twice the number of teeth on the stem.

6. A high pressure fluid flow control valve as in claim 5 further including:
 a radial groove extending partially into the body portion adjacent the fluid input port; and
 a pressure bleed port on the interior of the input port and coupled to the radial groove such that the pressure in the valve chamber is prevented from exceeding a predetermined value.

7. A high pressure fluid flow control valve as in claim 6 further including a fluid seal surrounding the rotatable valve above the input port and below the threads for forming the hollow chamber coupling the input port to the output port.

8. A high pressure fluid flow control valve as in claim 7 further comprising a coupler attached to the valve stem such that rotation of the coupler rotates the threaded valve stem to control the degree of fluid flow through the valve between zero gallons per minute and a maximum number of gallons per minute.

9. A high pressure fluid flow control valve as in claim 8 further including:
 a substantially hollow U-shaped cap surrounding and protecting the body portion; and
 fastening means attaching the cap to the coupler such that rotation of the cap rotates the coupler and the threaded valve stem to control the degree of fluid flow through the valve.

* * * * *